(12) United States Patent
St. Clair

(10) Patent No.: US 10,241,645 B2
(45) Date of Patent: Mar. 26, 2019

(54) LOCK SCREEN WITH SOCIALIZED APPLICATIONS

(71) Applicant: Facebook, Inc., Menlo Park, CA (US)

(72) Inventor: Luke St. Clair, Corte Madera, CA (US)

(73) Assignee: Facebook, Inc., Menlo Park, CA (US)

( * ) Notice: Subject to any disclaimer, the term of this patent is extended or adjusted under 35 U.S.C. 154(b) by 443 days.

(21) Appl. No.: 14/808,974

(22) Filed: Jul. 24, 2015

(65) Prior Publication Data

US 2015/0331561 A1 Nov. 19, 2015

Related U.S. Application Data

(63) Continuation of application No. 13/767,724, filed on Feb. 14, 2013, now Pat. No. 9,124,545.

(51) Int. Cl.
| | |
|---|---|
| *G06F 3/00* | (2006.01) |
| *G06F 3/0482* | (2013.01) |
| *H04L 12/58* | (2006.01) |
| *G06F 17/30* | (2006.01) |
| *H04L 29/06* | (2006.01) |
| *G06F 8/61* | (2018.01) |
| *G06F 3/0484* | (2013.01) |
| *G06F 3/0481* | (2013.01) |

(52) U.S. Cl.
CPC ........ *G06F 3/0482* (2013.01); *G06F 3/04842* (2013.01); *G06F 8/61* (2013.01); *G06F 17/30554* (2013.01); *G06F 17/30958* (2013.01); *H04L 51/32* (2013.01); *H04L 65/403* (2013.01); *G06F 3/0481* (2013.01)

(58) Field of Classification Search
CPC .......................... G06F 17/30554; H04L 51/32
See application file for complete search history.

(56) References Cited

U.S. PATENT DOCUMENTS 8,261,258 B1 * 9/2012 Jianu ........................ G06F 8/61
717/169
9,071,603 B1 * 6/2015 Frederick .............. H04L 67/125
(Continued)

FOREIGN PATENT DOCUMENTS

| CN | 102067463 A | 5/2011 |
|---|---|---|
| CN | 102231097 A | 11/2011 |

(Continued)

OTHER PUBLICATIONS

Notification of Reasons for Rejection (Office Action), Japan Patent Office, Patent Application No. 2015-558086 (with English Translation), dated Jan. 12, 2016.
(Continued)

*Primary Examiner* — Linh K Pham
(74) *Attorney, Agent, or Firm* — Baker Botts L.L.P.

(57) ABSTRACT

In one embodiment, a method includes receiving information associated with interactions of one or more first users with one or more applications; identifying one or more interactive elements associated with the applications based at least in part on the received information; and providing for display on a user interface (UI), one or more of the identified interactive elements. The displayed interactive elements are dynamically adjusted based on receiving updated information of interactions associated with one or more of the interactive elements.

19 Claims, 6 Drawing Sheets

(56) References Cited

U.S. PATENT DOCUMENTS

| | | |
|---|---|---|
| 2005/0108406 A1 | 5/2005 | Lee |
| 2010/0146384 A1* | 6/2010 | Peev .................... H04M 1/673 715/255 |
| 2010/0146437 A1* | 6/2010 | Woodcock ............ G06Q 30/06 715/806 |
| 2011/0138328 A1* | 6/2011 | Ge ........................ G06F 3/0482 715/811 |
| 2011/0238302 A1* | 9/2011 | Lee ........................ G01C 21/20 701/408 |
| 2012/0143921 A1 | 6/2012 | Wilson et al. |
| 2012/0202428 A1* | 8/2012 | Mirbaha ............... H04L 12/185 455/41.2 |
| 2012/0202485 A1* | 8/2012 | Mirbaha ............... H04W 76/45 455/426.1 |
| 2012/0202551 A1* | 8/2012 | Mirbaha ................. H04W 4/08 455/518 |
| 2012/0208501 A1* | 8/2012 | Tsuda ..................... H04M 1/67 455/411 |
| 2012/0284297 A1* | 11/2012 | Aguera-Arcas ..... G06F 3/03547 707/769 |
| 2012/0290972 A1* | 11/2012 | Yook .................... G06F 3/0482 715/800 |
| 2012/0331548 A1* | 12/2012 | Tseng ..................... H04M 1/67 726/19 |
| 2013/0029766 A1* | 1/2013 | Wickett .............. G07F 17/3267 463/42 |
| 2013/0031171 A1 | 1/2013 | Serena |
| 2013/0102281 A1* | 4/2013 | Kanda .................... G06F 21/36 455/410 |
| 2013/0173287 A1* | 7/2013 | Cashman ................. E04H 3/08 705/2 |
| 2013/0187753 A1* | 7/2013 | Chiriyankandath .. G06F 3/0488 340/5.51 |

FOREIGN PATENT DOCUMENTS

| | | |
|---|---|---|
| CN | 102866838 A | 1/2013 |
| JP | 2004-145663 | 5/2004 |
| JP | 2008-199211 | 8/2008 |
| JP | 2010-157019 | 7/2010 |
| JP | 2011-527785 | 11/2011 |
| JP | 2012-64151 | 3/2012 |
| JP | 2012-215938 | 11/2012 |
| WO | WO 2010/013609 A1 | 2/2010 |
| WO | WO 2012/098360 | 7/2012 |
| WO | WO 2012/131429 A1 | 10/2012 |
| WO | WO 2012/176317 | 12/2012 |

OTHER PUBLICATIONS

Notification of the First Office Action, State Intellectual Property Office of the People's Republic of China, Patent Application No. 2014800209744 (with English Translation), dated May 3, 2016.

Communication, Supplementary European Search Report, Annex to the European Search Report, European Patent Office, Patent Application No. EP 14 75 1746, dated Dec. 8, 2016.

Linder, B., "Add widgets to your Android Lock Screen with FlyScreen," http://mobiputing.com/2010/03/add-widgets-to-your-android-lock-screen-with-flyscreen/, retrieved on May 31, 2012, Mar. 11, 2010.

Raja, H. Q., "How to Replace and Customize Android Lock Screen [Guide]," http://www.addictivetips.com/mobile/how-to-replace-and-customize-android-lock-screen-guide/, retrieved on Dec. 17, 2014, Jun. 10, 2011.

Examination report No. 1 for standard patent application, Australian Government, Patent Application No. 2016247057, dated Oct. 6, 2017.

Communication, European Patent Office, Patent Application No. 14 751 746.0, dated Oct. 19, 2017.

Asako Fusano, "Selling Sumaho Thorough Review XPERIA", Androider +, Impress Japan Co., Ltd., vol. 3, No. 1, pp. 14-17, Dec. 21, 2012.

Notification of Reasons for Rejection, Japan Patent Office, Application No. 2016-188156 (with English translation), dated Jan. 30, 2018.

AU Office Action received for Patent Application No. 2016247057, dated Aug. 17, 2018.

DistroWatch Page Hit Ranking, Available at https://distrowatch.com/dwres.php?resource=popularity, published on Jan. 15, 2013 as per Wayback Machine, 6 pages, Jan. 15, 2013.

MX OA received for Patent Application No. MX/a/2017/004216 (with English Translation), dated Aug. 14, 2018.

EP Communication received from EPO for Patent Application No. 14751746.0-1216, dated Aug. 24, 2018.

JP OA received from JPO for Patent Application No. 2016-188156. (with English Translation), dated Jun. 21, 2018.

\* cited by examiner

LOCK SCREEN WITH SOCIALIZED APPLICATIONS

PRIORITY

This application is a continuation under 35 U.S.C. § 120 of U.S. patent application Ser. No. 13/767,724, filed 14 Feb. 2013.

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a lock screen of a mobile computing device may have a portion that displays interactive elements or icons corresponding to a subset of the applications installed on the mobile device. For example, the lock screen may have a hit target that is moved to a particular position to activate a launch area to display the interactive elements associated with a subset of applications installed on the mobile device. One or more of the displayed applications may be launched from the launch area of the lock screen by tapping the displayed interactive element. In particular embodiments, the subset of applications displayed in the launch area may be determined by various criteria. In particular embodiments, the criteria may based social-graph information associated with the user. For example, the launch area may display interactive elements associated with two applications used most often by the user and four applications used most often by "friends" of the user. The applications used most often by "friends" of the user may be automatically installed on the mobile computing device. In particular embodiments, the launch area may display an interactive element corresponding to a notification of activity of a "friend" on a particular application. For example, if a friend has activity on a particular game application, such as for example FARMVILLE, the interactive element corresponding to the FARMVILLE application may be displayed in the launch area.

Another criteria for determining the applications in the launch area may be based on inferred "urgency" or "relevance". For example, if the user is particularly active on FARMVILLE, any new activity may cause the interactive element corresponding to FARMVILLE application to be displayed in the launch area. As another example, a message from a "friend" may cause the interactive element corresponding to a messaging application to be displayed in the launch area. In particular embodiments, particular applications may be prevented from being displayed in the launch area based on a maturity rating or sensitivity of the app, such as for example, dating apps. The user may tap one of icons to launch the application from the launch area.

DESCRIPTION OF EXAMPLE EMBODIMENTS

Figure 1:
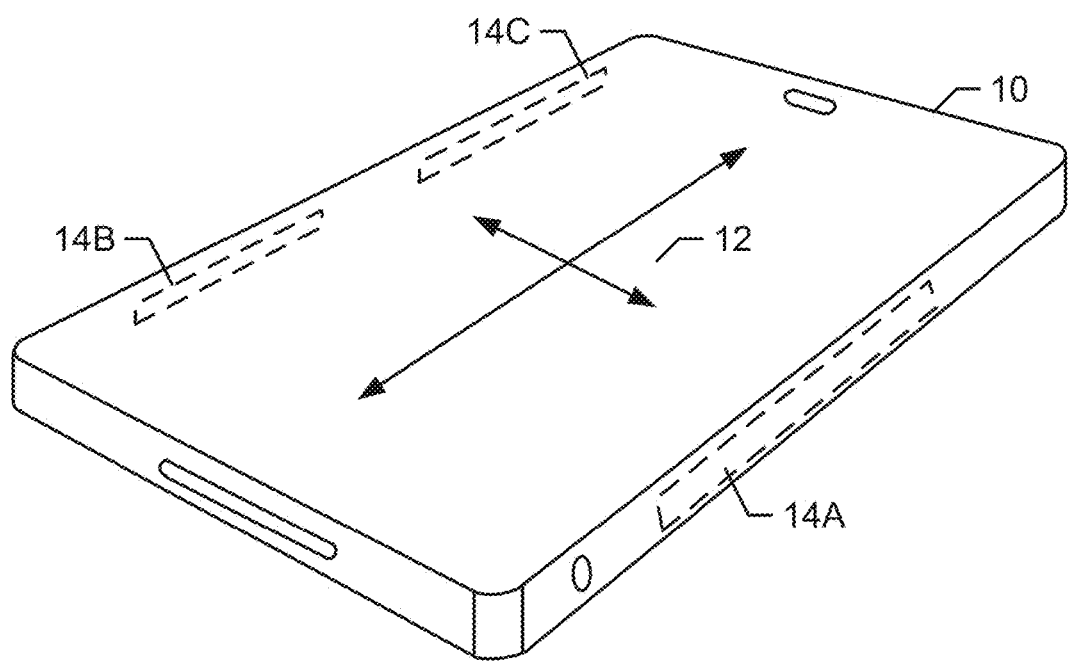
FIG. 1 illustrates an example mobile device.

FIG. 1 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 1, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate. Although this disclosure illustrates and describes a particular type of computing device, this disclosure contemplates a lock screen implemented on any suitable type of computing device, such as for example, a personal computer, tablet computer, connected television, or a smartphone.

In particular embodiments, mobile computing device 10 may present a user interface (UI) with socialized applications. In particular embodiments, the UI with socialized applications of mobile computing device 10 may be a lock screen that in a locked mode prevents any or a particular interaction with mobile computing device 10. The lock screen may be presented when mobile computing device 10 is in the locked mode and mobile computing device 10 may be released from the locked mode or directed to a personal identification number (PIN) lock by performing a pre-determined touch gesture. In particular embodiments, the user may be able to access all or a subset of all the features of mobile computing device 10 available to the user during normal operation of mobile computing device 10 by performing a pre-determined touch gesture, such as for example moving the hit target interactive element to another particular position, as described below. Although this disclosure illustrates and describes a particular UI with particular UI elements having particular functionality, this disclosure contemplates any suitable UI, such as for example an application launcher, with any suitable UI elements having any suitable functionality.

Figure 2:
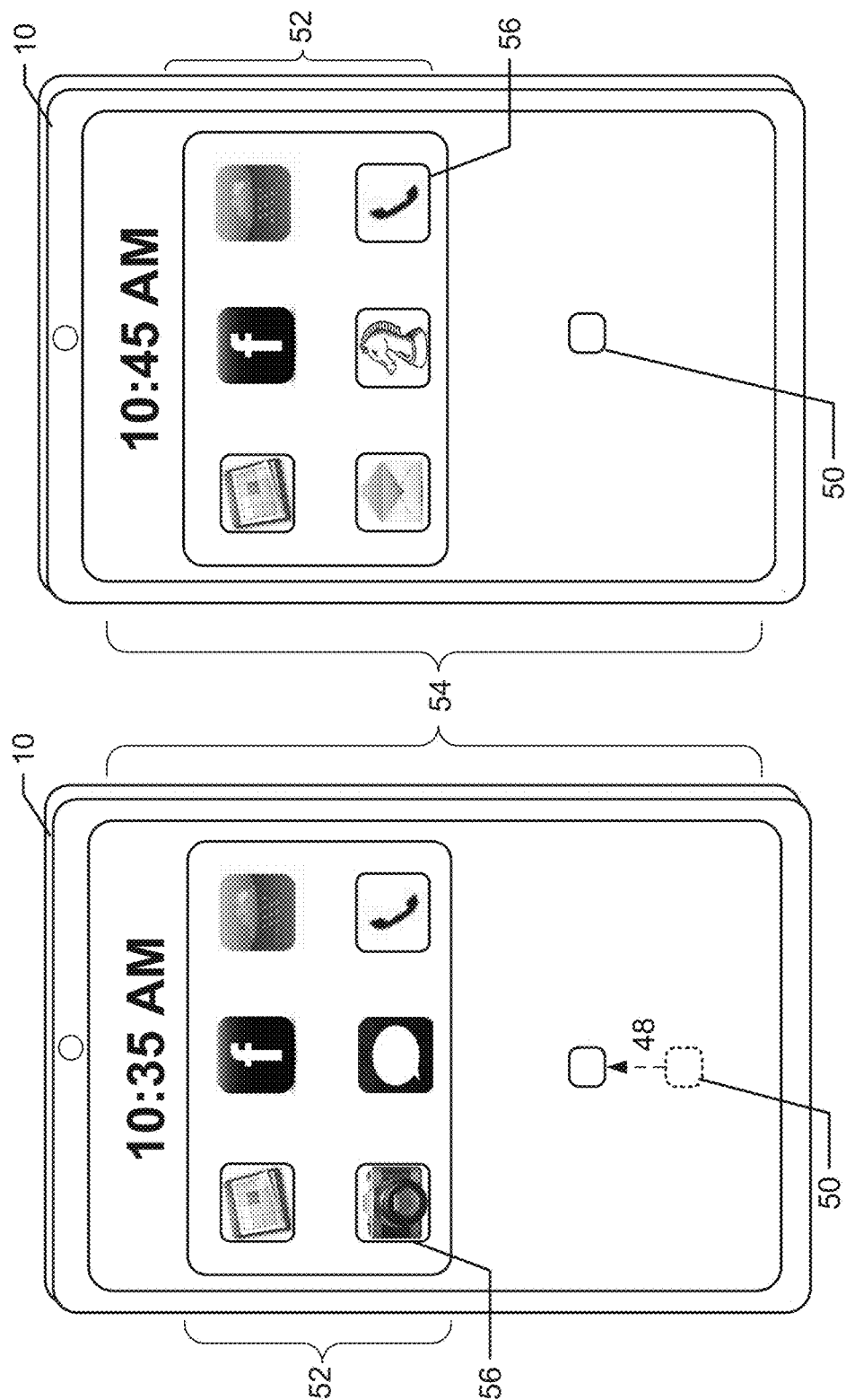
FIGS. 2A-B illustrate example wireframes for an example user interface (UI) with socialized applications.

FIGS. 2A-B illustrate example wireframes for an example lock screen with socialized applications. As described above, the UI with socialized applications may be a lock screen 54 provided for display when mobile computing device 10 is in the locked mode. In particular embodiments, lock screen 54 may include one or more hit target interactive elements 50 that may be moved into one or more positions that each correspond to one or more functions provided by lock screen 54. As an example and not by way of limitation, manipulating hit-target interactive element 50 to a first particular position may release mobile computing device 10 from the locked mode. As another example, manipulating hit-target interactive element 50 to a second particular position 48 may activate display of a launch area 52 with one or more application interactive elements 56, such as for example icons, that each correspond to an application or a function of mobile computing device 10. In particular embodiments, launch area 52 may function as, be integrated with, or work in conjunction with an application launcher of mobile computing device 10. Furthermore, application interactive elements 56 displayed in launch area 52 may be a subset of the applications installed on or functions of mobile computing device 10. An application or function of mobile computing device 10 may be executed or "launched" in response to detecting a pre-determined touch gesture, such as for example, tapping an application icon 56 of launch area 52 as illustrated in the example of FIG. 2A. In particular embodiments, the user of mobile computing device 10 may launch particular applications corresponding to application interactive elements 56 displayed in launch area 52 directly from launch area 52 of lock screen 54 without releasing mobile computing device 10 from the locked mode.

In particular embodiments, presentation of one or more of the application interactive elements 56 in launch area 52 may be determined based one or more criteria. In particular embodiments, a criteria may be based at least in part on usage information associated with mobile computing device 10. As an example and not by way of limitation, a frequency the user associated with mobile computing device 10 uses individual applications or functions of mobile computing device 10 may determine one or more application interactive elements 56 that are displayed in launch area 52. In particular embodiments, another criteria may be based at least in part on activity of other users. As an example and not by way of limitation, a frequency other users of a social-networking system with a relationship to the user (i.e. "friends") use a particular application or recent activity of the "friends" related to the particular application may determine one or more application interactive elements 56 that are displayed in launch area 52. Herein, the term "friend" may refer to any other user of a social-networking system with whom the user associated with mobile computing device 10 has formed a connection, association, or relationship via the social-networking system. As another example, a frequency other users with a similar profile as the user use a particular application or recent activity of the other users related to the particular application may determine one or more application interactive elements 56 that are displayed in launch area 52. In particular embodiments, a similar profile may include one or more similarities between the user and one or more other users of the social-networking system, such as for example, similar age, occupation, interests, or any combination thereof.

In particular embodiments, selection of one or more application interactive elements 56 may be determined based at least in part on usage information of the user or usage information associated with other users. As an example and not by way of limitation, particular application interactive elements 56 may initially be displayed in launch area 52, as illustrated in the example of FIG. 2A. In particular embodiments, as described above, launch area 52 may display a particular number of application interactive elements 56 with a subset of the displayed application interactive elements 56 being determined based on the applications most used by "friends" of the user and another subset of the displayed application interactive elements being determined based on the applications most used by the user. In particular embodiments, one or more applications used by "friends" of the user and not currently on mobile computing device 10 may be, automatically and without input from the user, downloaded to mobile computing device 10, depending on the privacy setting of the user, as appropriate. Furthermore, the downloaded applications may be installed when the user interacts with application interactive element 56 corresponding to the downloaded application or after the user confirms the installation of the downloaded application. In particular embodiments, the applications downloaded on mobile computing device 10 may be, automatically and without input from the user, installed on mobile computing device 10 depending on settings of the user, as appropriate.

In particular embodiments, application interactive elements 56 displayed in launch area 52 may be dynamically adjusted based at least in part on updated information associated with activity of other users. Application interactive elements 56 in launch area 52 may dynamically adjusted in response to receiving data corresponding to activity of other users, as illustrated in the example of FIG. 2B. As an example and not by way of limitation, presentation of a particular application interactive element 56 may correspond to a notification of recent activity of a "friend" on the application corresponding to the particular application interactive element 56. In particular embodiments, the social-networking system may determine one or more application interactive elements 56 for presentation or a configuration of one or more application interactive elements 56 in launch area 52 of mobile computing device 10 based at least in part on activity performed by a "friend" that is socially relevant to the user. In particular embodiments, information associated with activity of other users may be periodically pushed (i.e. sent to mobile computing device 10 without input from mobile computing device 10) by, for example, a server of the social-networking system, to mobile computing device 10. Alternatively or in addition, mobile device 10 may pull (i.e. sent to mobile computing device 10 after receiving a signal from mobile computing device 10) activity notifications to mobile computing device 10. Mobile computing device 10 may determine one or more application interactive elements 56 for presentation or the configuration of one or more application interactive elements 56 based at least in part on information associated with activity of other users received from the social-networking system.

As an example and not by way of limitation, a particular application interactive element 56, such as for example a chess game application, may be displayed in response to a "friend" of the user performing activity related to the particular application, such as for example making a move in a game of chess being played between the "friend" and the user. As another example, a particular application interactive element 56, such as for example a messaging application, may be displayed in response to a "friend" of the user having activity related to the particular application, such as for example receiving a message from the "friend". In particular embodiments, presentation of the particular application interactive element 56 may be given priority over presentation of other application interactive elements 56. As an example and not by way of limitation, presentation of the application interactive element 56 corresponding to a chess game may receive priority over other application interactive elements 56 if the user is particularly active on the chess game. Furthermore, a particular application interactive element 56 associated with an application having a higher priority may be displayed in place of a particular application interactive element 56 associated with an application having a lower priority being displayed in launch area 52. Although this disclosure illustrates and describes a particular lock screen with particular interactive elements corresponding to particular applications, this disclosure contemplates any suitable UI with any suitable interactive elements corresponding to any suitable applications.

Figure 3:
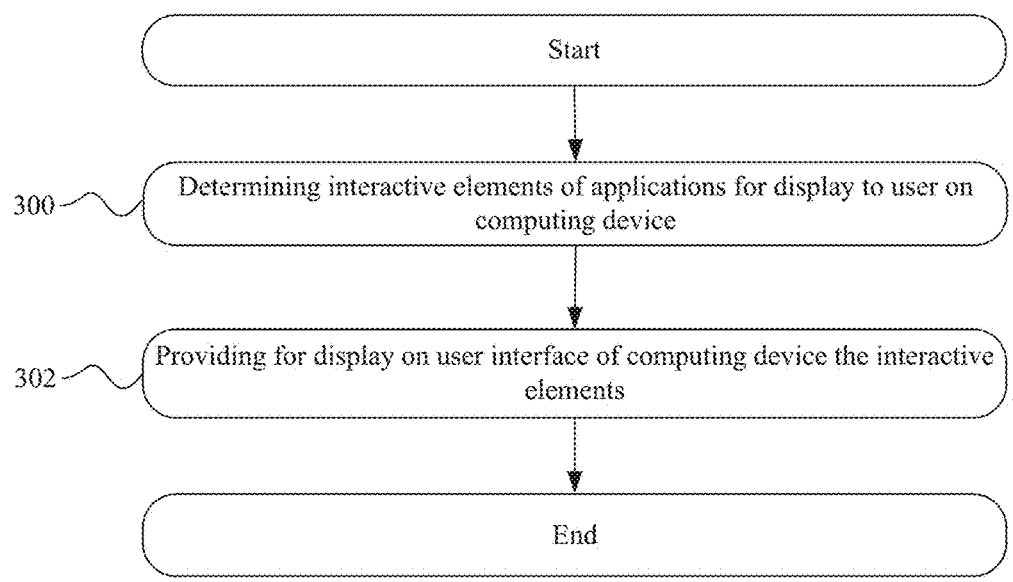
FIG. 3 illustrates an example method socializing applications on a UI.

FIG. 3 illustrates an example method for socializing applications on a UI. The method may start at step 300, where a computing device of a first user of a social-networking system determines one or more interactive elements of one or more applications for display to the user on the computing device. In particular embodiments, the determination may be based at least in part on activity by one or more second users of the social-networking system associated at least in part with one or more applications. In particular embodiments, the second users may be identified for the determination based at least in part on social-graph information associated with the first and second users at least in part from a social graph of the social-networking system. At step 302, the computing device provides for display on a lock screen of the computing device one or more of the interactive elements, at which point the method may end. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
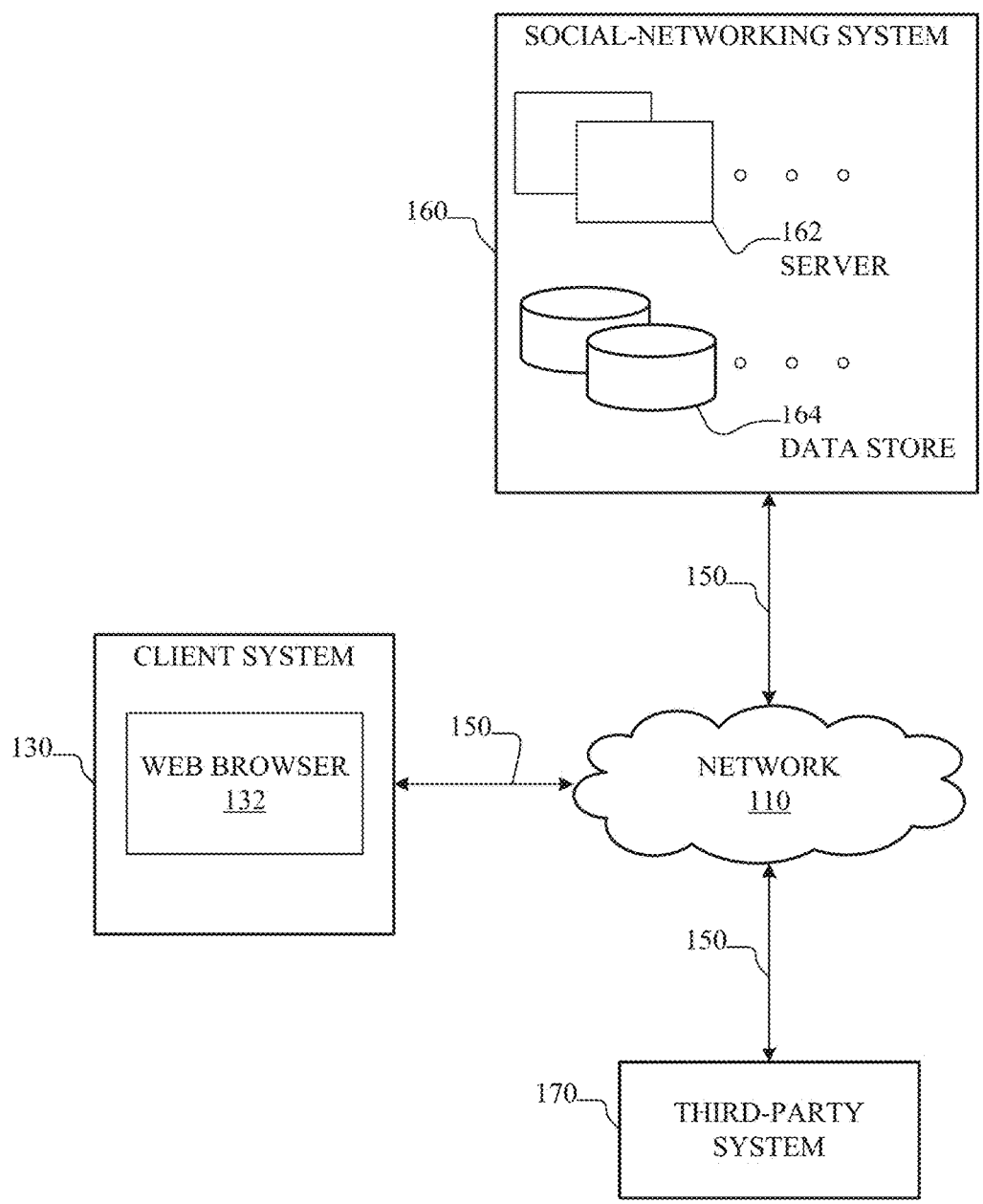
FIG. 4 illustrates an example network environment associated with a social-networking system.

FIG. 4 illustrates an example network environment 100 associated with a social-networking system. Network environment 100 includes a client system 130, a social-networking system 160, and a third-party system 170 connected to each other by a network 110. Although FIG. 4 illustrates a particular arrangement of client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 4 illustrates a particular number of users, client systems 130, social-networking systems 160, third-party systems 170, and networks 110, this disclosure contemplates any suitable number of users, client systems 130, social-networking systems 160, third-party systems 170, and networks 110. As an example and not by way of limitation, network environment 100 may include multiple users, client system 130, social-networking systems 160, third-party systems 170, and networks 110.

In particular embodiments, the user may be an individual (human user), an entity (e.g. an enterprise, business, or third-party application), or a group (e.g. of individuals or entities) that interacts or communicates with or over social-networking system 160. As described above, the user may interact with social-networking system 160 through client system 130. As an example and not by way of limitation, the user may send friend requests to users, responding to friend requests from users, search for users on the social-networking system, or access user profiles of users on social-networking system 160. As another example, the user may upload a photograph or video, check in at a location, update a status of the user, upload a comment on a post by another user on social-networking system 160, or write a message to or reply to a message from another user on social-networking system 160. In particular embodiments, social-networking system 160 may be a network-addressable computing system hosting an online social network. Social-networking system 160 may be accessed by the other components of network environment 100 either directly or via network 110.

Social-networking system 160 may generate, store, receive, and send social-networking data, such as, for example, user-profile data, concept-profile data, social-graph information, or other suitable data related to the online social network. As described above, the application interactive elements displayed in the launch area of the lock screen of client system 130 may be dynamically adjusted based at least in part on activity of users with a relationship to the user (e.g. "friends") based at least in part on social-graph information, described below. As an example and not by way of limitation, an application interactive element corresponding to a particular game application may be added to the launch area of the lock screen of client system 130 as activity by "friends" of the user on social-networking system 160 is being logged. As another example, the launch area of the lock screen of client system 130 may be dynamically adjusted to display an application interactive element corresponding to social-networking system 160 in response to a "friend" of the user having an interaction with the user through social-networking system 160, such as for example, posting a status update or uploading a photo directed to the user. As described above, the application interactive elements displayed in the launch area of the lock screen of client system 130 may be dynamically adjusted based at least in part on activity of other users with a similar profile to the user based at least in part on user-profile data or social-graph information.

In particular embodiments, social-networking system 160 may include an authorization server that allows users to opt in or opt out of having their actions logged by social-networking system 160 or shared with other systems (e.g. third-party systems 170), such as, for example, by setting appropriate privacy settings. The authorization server of social-networking system 160 may be used to enforce one or more privacy settings of the users of social-networking system 160. A privacy setting of a user determines how particular information or content objects associated with the user can be shared. In particular embodiments, the information associated with activity of other users provided by social-networking system 160 for the UI with socialized applications may be restricted by the privacy settings of users of social-networking system 160. As an example and not by way of limitation, social-networking system 160 may restrict sending of information related to the activities of the users for the UI with socialized applications based at least in part on a maturity privacy setting or sensitivity of the applications being used by the users, as appropriate.

Third-party system 170 may be accessed by the other components of network environment 100 either directly or via network 110. In particular embodiments, one or more users may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example WI-FI or Worldwide Interoperability for Microwave Access (WIMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 5:
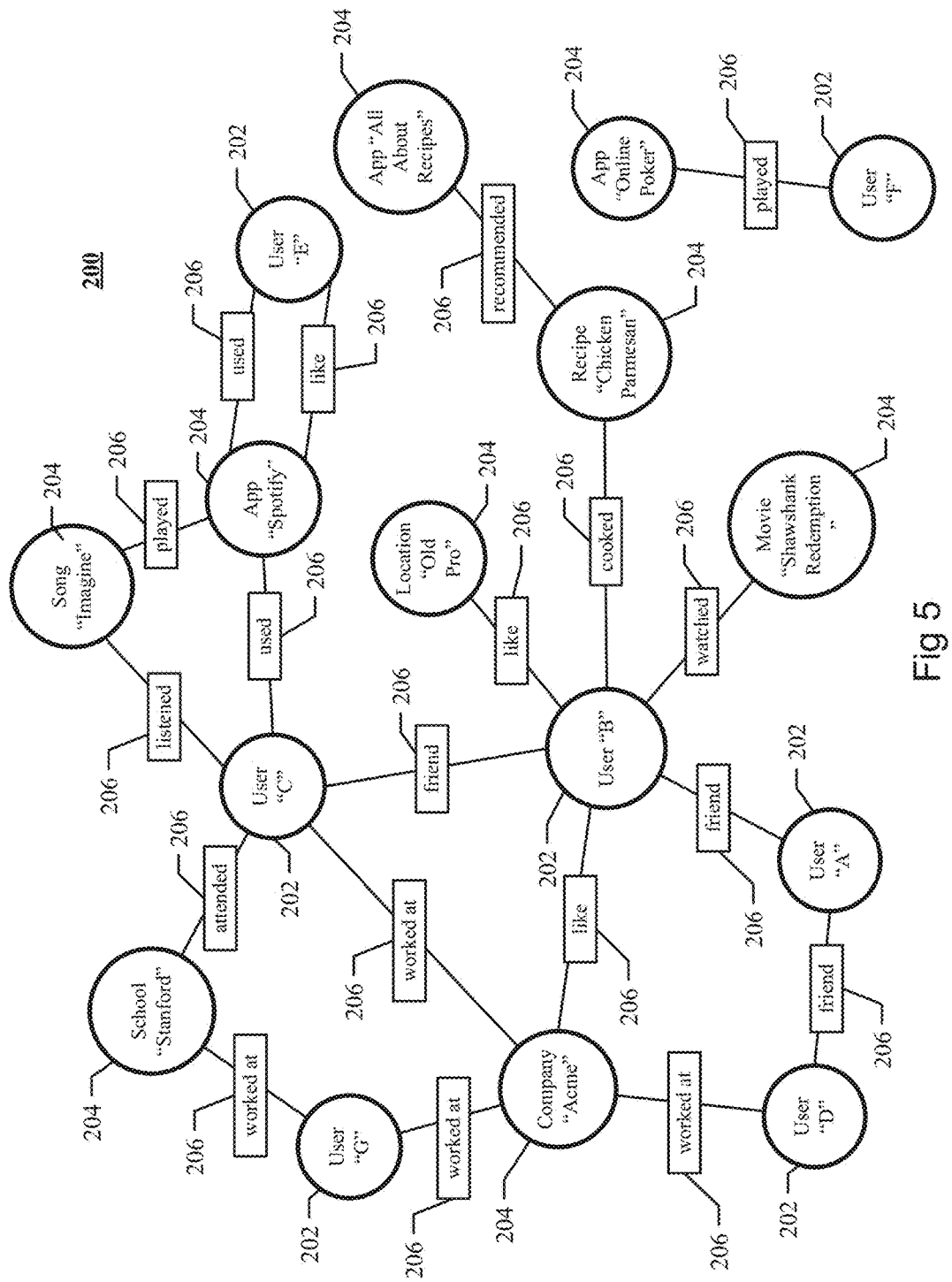
FIG. 5 illustrates an example social graph.

FIG. 5 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 5 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 5, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "like" icon. As another example, the socialized dash of a client system may include a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 5) between user nodes 202 corresponding to the user and concept nodes 204 corresponding to the song and application to indicate that the user listened to the song and used the application. Moreover, social-networking system 160 may create a "played" edge 206 (as illustrated in FIG. 5) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 5 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 6:
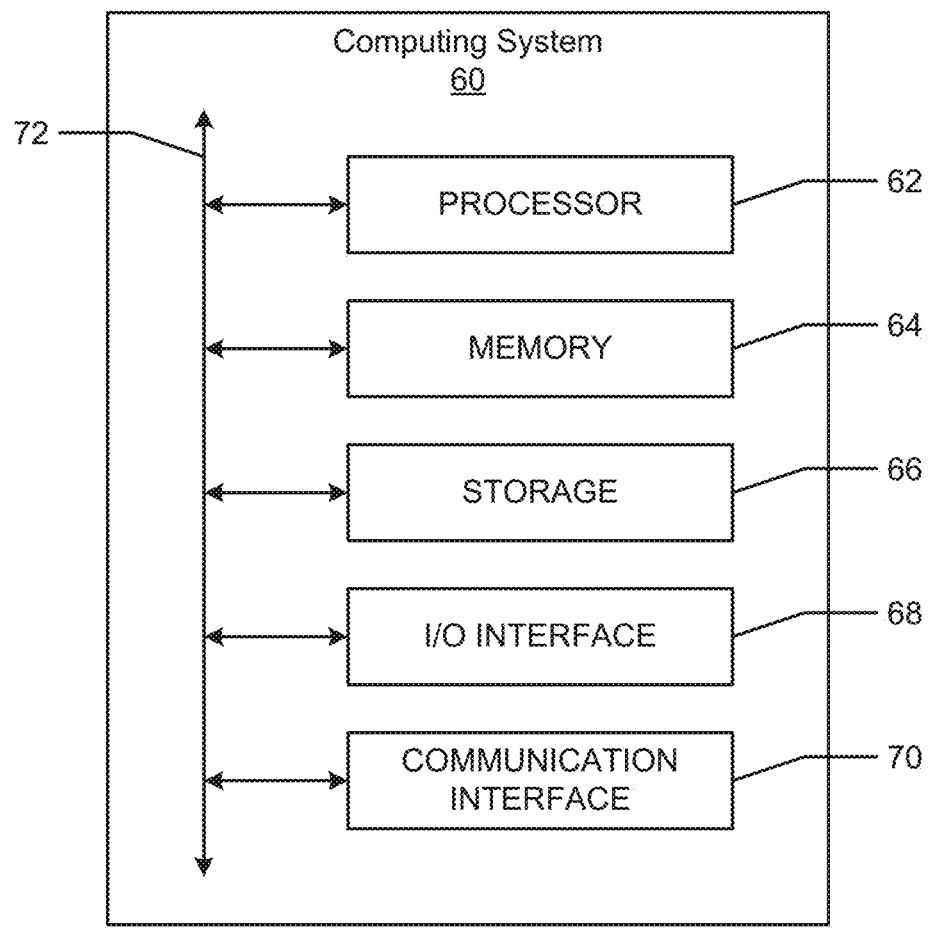
FIG. 6 illustrates an example computing system.

FIG. 6 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, identifying one or more first users that are associated with a second user of a client device based at least in part on information associated with a social graph of a social-networking system, social-graph information comprising information identifying one or more of the first users with a similar profile to the second user on the social-networking system;
    by the computing device, receiving information associated with interactions of the one or more first users with a first set of applications of the client device associated with the second user;
    by the computing device, identifying a first set of interactive elements associated with the first set of applications based at least in part on the received information;
    by the computing device, determining a second set of interactive elements associated with a second set of applications based at least in part on interactions of the second user, associated with the client device, with the second set of applications of the client device; and
    by the computing device, providing for display on a lock screen user interface (UI) of the client device of the second user, the first set of interactive elements associated with the first set of applications interacted by the one or more first users and the second set of interactive elements associated with the second set of applications interacted by the second user, wherein the displayed interactive elements are dynamically adjusted based on receiving updated information of interactions with the applications associated with one or more of the interactive elements by one or more of the first users or the second user.

2. The method of claim 1, wherein:
    the social graph comprises a plurality of nodes and edges connecting the nodes, a node in the graph corresponding to the second user, at least one node in the graph corresponding to each first user; and
    the social-graph information that the first users are identified comprises at least one of the nodes corresponding to one of the first users connected to the node corresponding to the second user by an edge.

3. The method of claim 1, wherein the updated information comprises information of a frequency of interaction one or more of the first users have with one or more of the respective applications of the first set.

4. The method of claim 1, wherein the updated information comprises information of a frequency of interaction the second user has with one or more of the respective applications of the second set.

5. The method of claim 1, wherein the dynamic adjustment of the displayed interactive elements comprises:
    determining a priority for the respective application of one or more of the displayed interactive elements; and
    replacing one or more of the displayed interactive elements with an interactive element corresponding to another application based on the determined priority.

6. The method of claim 1, wherein the lock screen UI comprises a launch area with one or more of the first set of interactive elements or the second set of interactive elements in a locked mode.

7. The method of claim 6, wherein the launch area operates at least in part as an application launcher when the client device is in the locked mode.

8. The method of claim 7, further comprising launching an application in response to detecting a pre-determined touch gesture on one or more of the first set of interactive elements or the second set of interactive elements displayed in the launch area.

9. The method of claim 1, wherein the first set of interactive elements associated with the first set of applications correspond to a subset of applications installed on the client device of the second user.

10. The method of claim 1, further comprising:
  determining one or more applications currently not installed on the client device based on the updated information; and
  automatically and without input from the second user, installing one or more of the applications on the client device based at least in part on the determination.

11. The method of claim 1, wherein the interactions of one or more of the first users correspond to activity of one or more of the first users on a messaging application and one of the interactive elements of the first set corresponds to the messaging application.

12. The method of claim 1, wherein the interactions of one or more of the first users correspond to activity of one or more of the first users on a gaming application and one of the interactive elements of the first set corresponds to the gaming application.

13. The method of claim 1, wherein the interactions of one or more of the first users correspond to activity of one or more of the first users on the social-networking system and one of the interactive elements of the first set corresponds to a social-networking application.

14. The method of claim 1, wherein the similar profile that the one or more of the first users have with the second user comprises one or more of a similar age, a similar occupation, or similar interests.

15. One or more computer-readable non-transitory storage media embodying software configured when executed to:
  identify one or more first users that are associated with a second user of a client device based at least in part on information associated with a social graph of a social-networking system, social-graph information comprising information identifying one or more of the first users with a similar profile to the second user on the social-networking system;
  receive information associated with interactions of the one or more first users with a first set of applications of the client device associated with the second user;
  identify a first set of interactive elements associated with the first set of applications based at least in part on the received information;
  determine a second set of interactive elements associated with a second set of applications based at least in part on interactions of the second user, associated with the client device, with the second set of applications of the client device; and
  provide for display on a lock screen user interface (UI) of the client device of the second user, the first set of interactive elements associated with the first set of applications interacted by the one or more first users and the second set of interactive elements associated with the second set of applications interacted by the second user, wherein the displayed interactive elements are dynamically adjusted based on receiving updated information of interactions with the applications associated with one or more of the interactive elements by one or more of the first users or the second user.

16. The one or more computer-readable non-transitory storage media of claim 15, wherein:
  the social graph comprises a plurality of nodes and edges connecting the nodes, a node in the graph corresponding to the second user, at least one node in the graph corresponding to each first user; and
  the social-graph information that the first users are identified comprises at least one of the nodes corresponding to one of the first users connected to the node corresponding to the second user by an edge.

17. The one or more computer-readable non-transitory storage media of claim 15, wherein the similar profile that the one or more of the first users have with the second user comprises one or more of a similar age, a similar occupation, or similar interests.

18. A device comprising:
  a processor; and
  one or more computer-readable non-transitory storage media coupled to the processor and embodying software that:
  identify one or more first users that are associated with a second user of a client device based at least in part on information associated with a social graph of a social-networking system, social-graph information comprising information identifying one or more of the first users with a similar profile to the second user on the social-networking system;
  receive information associated with interactions of the one or more first users with a first set of applications of the client device associated with the second user;
  identify a first set of interactive elements associated with the first set of applications based at least in part on the received information;
  determine a second set of interactive elements associated with a second set of applications based at least in part on interactions of the second user, associated with the client device, with the second set of applications of the client device; and
  provide for display on a lock screen user interface (UI) of the client device of the second user, the first set of interactive elements associated with the first set of applications interacted by the one or more first users and the second set of interactive elements associated with the second set of applications interacted by the second user, wherein the displayed interactive elements are dynamically adjusted based on receiving updated information of interactions with the applications associated with one or more of the interactive elements by one or more of the first users or the second user.

19. The device of claim 18, wherein the similar profile that the one or more of the first users have with the second user comprises one or more of a similar age, a similar occupation, or similar interests.

* * * * *